United States Patent [19]

Vrba

[11] 3,832,496

[45] Aug. 27, 1974

[54] LINK ACCESSING ARRANGEMENT INCLUDING SQUARE-WAVE CLOCK GENERATOR

[75] Inventor: James J. Vrba, Berwyn, Ill.

[73] Assignee: GTE Automatic Electric Laboratories Incorporated, Northlake, Ill.

[22] Filed: Jan. 2, 1973

[21] Appl. No.: 320,398

[52] U.S. Cl. .................................... 179/18 J
[51] Int. Cl. .................................... H04q 11/04
[58] Field of Search .................... 179/18 J; 331/57

[56] References Cited

UNITED STATES PATENTS

| | | | |
|---|---|---|---|
| 3,388,340 | 6/1968 | Loughry | 331/4 |
| 3,395,362 | 7/1968 | Sutherland | 331/57 |
| 3,592,970 | 7/1971 | Cappetti et al. | 179/18 J |
| 3,707,140 | 12/1972 | Gueldenpfennig et al. | 179/18 J |

*Primary Examiner*—Thomas W. Brown

[57] ABSTRACT

A link accessing arrangement for supplying square-wave clock pulses from a common transceiver unit to a plurality of sub-system transceiver units via a plurality of links extending therebetween includes a logically inverting series circuit for providing an odd number of inversions, the output of the inverting circuit being coupled to its input to provide an unstable loop arrangement to generate the square-wave clock pulses, the loop including a portion of the common unit and a selected one of the links together with a portion of the sub-system unit associated therewith. A switching arrangement in the common unit transfers selectively the links and their sub-system units into and out of the loop to cause the clock pulses to be supplied to and from the selected sub-system units, and a delay circuit connected in series in the loop located within the common unit limits the frequency of the clock pulse signals. A scanner in the common unit causes the switching circuit to transfer the links and their sub-system units sequentially in response to the clock pulses.

4 Claims, 1 Drawing Figure

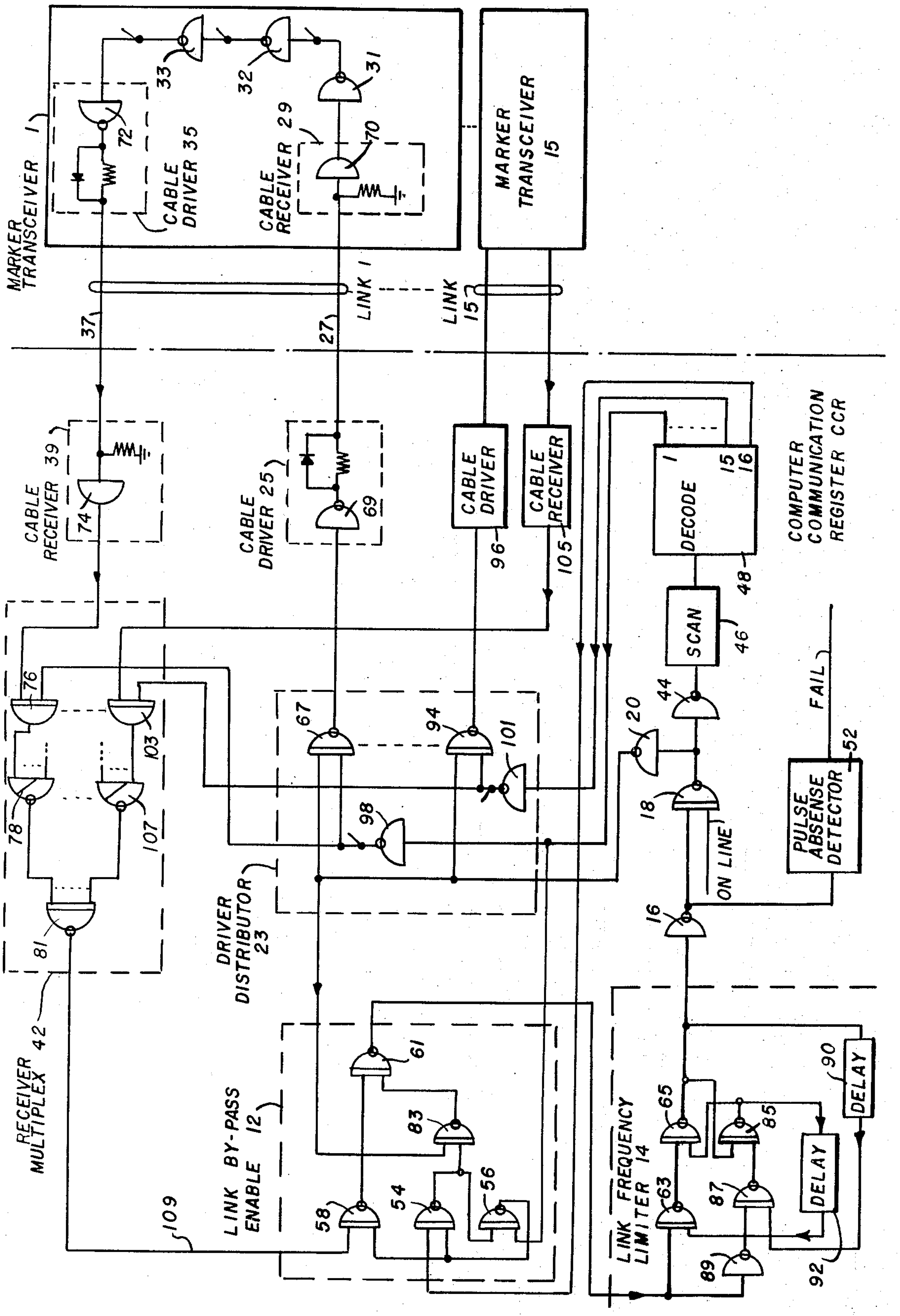
MARKER TRANSCEIVER 1
CABLE DRIVER 35
CABLE RECEIVER 29
MARKER TRANSCEIVER 15
LINK 1
LINK 15
CABLE RECEIVER 39
CABLE DRIVER 25
CABLE DRIVER
CABLE RECEIVER
DECODE
COMPUTER COMMUNICATION REGISTER CCR
SCAN
FAIL
PULSE ABSENSE DETECTOR
ON LINE
RECEIVER MULTIPLEX 42
DRIVER DISTRIBUTOR 23
LINK BY-PASS ENABLE 12
LINK FREQUENCY LIMITER 14
DELAY
DELAY

LINK ACCESSING ARRANGEMENT INCLUDING SQUARE-WAVE CLOCK GENERATOR

BACKGROUND OF THE INVENTION

1. Field of the Invention

This invention relates to a link accessing arrangement including a square-wave clock generator, and it more particularly relates to such an arrangement for supplying square-wave clock pulses from a common transceiver unit to a plurality of sub-system transceiver units via a plurality of links extending therebetween.

2. Description of the Prior Art

Communication switching systems, such as telephone switching systems, have employed serial message-sending transceivers for communicating with a common data processor unit serving to provide translation information and maintenance information to other subsystems, such as markers. The transceivers supply the information in serial form over two-way links interconnecting the common data processor unit and the subsystems. An example of such a transceiver arrangement is disclosed in U.S. Pat. No. 3,349,330 to W. R. Wedmore.

In a co-pending patent application Ser. No. 320,412, filed the same day as the present application, now U.S. Pat. No. 3,814,859, by J. J. Vrba and C. K. Buedel, for a COMMUNICATION SWITCHING SYSTEM TRANSCEIVER ARRANGEMENT FOR SERIAL TRANSMISSION, there is disclosed a transceiver arrangement wherein a fixed-frequency clock generator supplied square-wave pulses from the common transceiver unit to a plurality of sub-system transceiver units over links interconnecting them. The square-wave clock pulses are returned from the sub-system units to the common units so that when the sub-system unit sends information to the common unit, the clock signals are transferred with the data information. The sending of a bit of information, either from the common unit or a sub-system unit, occurs during the leading edge of a clock pulse signal, and the receiving of that same information bit occurs during the trailing edge of the same signal. As a result, the sending and receiving of information is synchronized in this manner, and upon receiving the information, the receiving unit can supply information to the sending unit as to whether or not the message was properly received in regard to, for example, proper or improper parity of the message.

While such an arrangement is satisfactory for some applications, it would be highly desirable to have an arrangement which includes a square-wave generator to adjust automatically the frequency of the clock pulses with respect to the length of the links. In this regard, for the longer links, the cabling interconnecting the common unit with the remote sub-system unit can provide an unduly long propagation delay to cause the common unit and the sub-system unit to operate out-of-synchronism. Moreover, it would be highly desirable to have such an arrangement which includes a simplified square-wave generator.

SUMMARY OF THE INVENTION

The object of this invention is to provide a new and improved link accessing arrangement for supplying square-wave clock pulses from a common transceiver unit to a plurality of sub-system transceiver units via a plurality of links extending therebetween, the square-wave clock pulses being of a variable frequency depending upon the length of the links.

Another object of the present invention is to provide a new and improved square-wave pulse generator, which is efficient in operation and simplified in design.

According to the invention, a link accessing arrangement includes an inverting circuit arranged in series for providing an odd number of inversions, the output of the inverting circuit being coupled to its input to provide an unstable loop arrangement to generate the square-wave clock pulses, the loop including a portion of the common transceiver unit and a selected one of the links together with a portion of the sub-system transceiver unit associated therewith. A switching circuit in the common unit transfers selectively the links and their subsystem units into and out of the loop to cause the clock pulses to be supplied to and from the selected sub-system units. A delay circuit connected in series with the loop within the common unit limits the frequency of the clock pulse signals. A scanning circuit in the common unit causes the switching circuit to transfer the links and their subsystem units sequentially in response to the clock pulses.

CROSS-REFERENCES TO RELATED APPLICATIONS

The present invention may be incorporated into the transceiver arrangement disclosed in the foregoing-mentioned United States patent application, entitled COMMUNICATION SWITCHING SYSTEM TRANSCEIVER ARRANGEMENT FOR SERIAL TRANSMISSION.

DESCRIPTION OF THE DRAWINGS

The drawing is a functional block diagram of the link accessing arrangement including the square-wave clock generator of the present invention.

DESCRIPTION OF THE PREFERRED EMBODIMENT

Referring now to the drawing, there is shown a link accessing arrangement for supplying recurring square-wave clock pulses from a common computer communication transceiver register CCR to a plurality of marker sub-system transceiver registers designated 1 through 15 via 15 links extending therebetween in accordance with the present invention. The arrangement of the present invention generally comprises a closed loop circuit if logic gates producing an odd number of inversions to provide an unstable loop arrangement to generate recurring square-wave clock pulses. The inventive arrangement includes a link by-pass enable circuit 12, a link frequency limiter 14, a series of gates 16, 18 and 20, a driver distributor 23, a cable driver 25, an outgoing conductor 27 of a link 1, a cable receiver 29 of a marker transceiver 1, an odd number of series connected inverter gates 31–33, a cable driver 35 of the marker transceiver 1, an incoming conductor 37 of the link 1, a cable receiver 39 of the register CCR, and a receiver multiplex circuit 42, which completes the loop back to the link by-pass enable circuit 12. An inverter gate 44 having its input connected to the output of the gate 18 detects the squarewave pulses being generated by the closed loop to step a scanner circuit 46 which in turn is decoded by a decoder 48 to control the driver distributor 23 and the receiver multiplex 42 for causing them to transfer the links and their marker transceivers sequentially in response to each clock pulse generated by the arrangement of the present invention. In this regard, the driver distributor 23 and the receiver multiplex 42 connect and disconnect selectively and individually from the common portion of the loop within the computer communication register CCR the link and marker transceiver portion of the closed loop, the link and transceiver portion of the loop comprising a two-way link and a portion of its associated marker transceiver. The link includes an incoming and an outgoing conductor.

A pulse absence detector 52 has its input connected to the utput of the gate 16 for detecting the presence of the square-wave clock pulses so that if they fail to be generated, the detector 52 generates a signal FAIL for maintenance purposes. The scanner 46 is a four-stage binary counter which is a cyclically interconnected ring counter for counting to 16. In order to cause the square-wave clock pulses to continue to be generated within a smaller loop when the decoder 48 decodes its sixteenth state of the scanner 46, the decoded output of the decoder 48 corresponding to the sixteenth state of the scanner 48 for which no link exists, sets a bistable latch comprising gates 54 and 56 to bypass the link and transceiver portion of the closed loop and the distributor and multiplexing circuits by connecting the output of the inverter gate 20 to the link bypass enable circuit 12 as hereinafter described in greater detail.

Considering now the arrangement of the present invention in greater detail, the closed loop for generating the square-wave clock pulses will first be considered. The loop comprises a NAND gate 58 and a NAND gate 61 of the by-pass enable circuit 12, a pair of NAND gates 63 and 65 of the link frequency limiter circuit 14, the inverter gate 16, a NAND gate 18, the inverter gate 20, an AND gate 67 of the driver distributor 23, an inverter gate 69 of the cable driver 25, a non-inverting gate 70 of the cable receiver 29, the intermediate gates 31–33, an inverter gate 72 of the cable driver 35, a non-inverting gate 74 of the cable receiver 39, an AND gate 76 of the receiver multiplex 42, a NOR gate 78 of the receiver multiplex 42 and a NAND gate 81 of the receiver multiplex 42, the output of the gate 81 being connected to one of the inputs to the gate 58 of the link bypass enable circuit 12 to complete the closed loop configuration. In accordance with the present invention, there are an odd number of inversions produced by the logic gates in the closed loop. In this regard, when the logic gates are arranged as indicated in the drawing, an unstable condition occurs in that the output of any one of the inverting gates in the closed loop is continuously causing the input of the next inverting gate to switch its output to an inverted state, whereby a square-wave signal is generated. It should be understood that in accordance with the present invention any odd number (including 1) of inverting gates may be incorporated within a closed loop configuration to provide an unstable series-connected closed loop for generating the square-wave pulse train. In this regard, the output of an odd number of inverting gates connected in series in connected to the input of the series to cause an unstable generation of square-wave recurring signals in accordance with the present invention.

The link bypass enable circuit 12 includes a NAND gate 83 which has its output connected to one of the inputs to the gate 61 and has its inputs connected to the output of the NAND gate 54 and to the output of the inverter 20 to cause the loop to extend back from the inverter gate 20 through the link by-pass enable circuit 12 to the link frequency limiter 14 and the gates 16 and 18 to the gate 20 when the latch comprising gates 54 and 56 is set. The link frequency limiter 14 includes a latch comprising NAND gates 65 and 85, which latch sets and resets alternatingly to follow the square-wave pulses, the gate 65 having one of its inputs connected to the output of the gate 63 and the input to the gate 85 being connected to a NAND gate 87. The output of the gate 61 is connected to the other input to the gate 63 and through an inverter gate 89 to the other input to the gate 87 for setting and resetting the latch alternatingly. The output of the gate 65 is connected to the inverter gate 16 within the closed loop and through a delay circuit 90 to the other input to the gate 87, and similarly the output of the gate 85 is connected through a delay circuit 92 to the other input to the gate 63 for controlling the frequency of the closed loop. In this regard, the delay circuits are a non-inverting delay circuit which may be a circuit having an adjustable time delay to control the setting and resetting of the latch comprising the gates 65 and 85, whereby the frequency of the generated square-wave clock pulses is controlled by the setting and resetting of the latch as determined by the delay circuits 90 and 92.

The gate 18 is a NAND gate having one of its inputs connected to the output of the gate 16 and having its other input connected to a signal ON LINE to serve as a starting signal for the arrangement of the present invention. The signal ON LINE is genrated by the register CCR as described in the foregoing-mentioned patent application.

The driver distributor 23 includes a series of 15 NAND gates, such as the NAND gate 94, which have their outputs connected through 15 cable drivers, such as the cable driver 25 associated with the gate 67 and the cable driver 96 associated with the gate 94, to the marker transceivers via the links associated therewith. The gates, such as the gate 67, are enabled sequentially via the outputs 1 through 15 of the decoder 48 connected through inverter gates, such as the inverter gate 98 for enabling the gate 67 and the inverter gate 101 for enabling the gate 94. The inverter gates also enable the AND gates, such as the AND gate 76 enabled by the inverter gate 98 and an AND gate 103 enabled by the output of the inverter gate 101, of the multiplex circuit 42. Also, the outputs of the inverter gates, such as the gates 98 and 101, are used to enable the data and status leads (not shown) as disclosed in the foregoing-mentioned patent application. The receiver multiplex 42 includes 15 AND gates, such as the gates 76 and 103 having their inputs connected to cable receiver circuits, such as the cable receiver 39 driving the gate 76 and a cable receiver 105 driving the gate 103. The outputs of the AND gates are connected to the inputs to the NOR gates, such as the gate 78 and NOR gate 107. The outputs of the NOR gates are connected to the inputs of a NAND gate 81. Such an arrangement provides a time division multiplexing arrangement for connecting selectively the cable receivers associated with the links on a time division multiplex basis to the other input to the NAND gate 58 of the link bypass enable circuit 12.

In order to insure that the arrangement of the present invention continues to generate square-wave pulses during the sequential accessing of the links, when a NAND gate, such as the gate 67, of the distributor is disabled after being enabled, it generates a one or true output signal due to the arrangement of the gates in the loop to cause the cable driver gate 69 to generate a zero or false signal. Also, with the arrangement of gates within the closed loop, when the scanner advances the arrangement to another link, the signal on the lead 37 is left at a zero or false condition. Moreover, upon advancing to another link, the enabled NAND gate of the distributor generates a zero output to cause its cable driver gate to generate a one output propagating through the link and transceiver portion of the closed loop so that a constant square-wave signal is generated within the common portion of the loop and the pulses are supplied to the links and their transceivers. If the scanner stops advancing at a given link, then the square-wave clock pulses are supplied to the selected link.

The frequency of the square-wave pulse train is dependent upon the propagation delays of the cables forming the links, and thus for longer cables, the frequency of the pulse train decreases accordingly, whereby the clock pulses operating the circuitry of the register CCR are adjusted accordingly in synchronism with the transceiver units and the cabling interconnecting them. Therefore, a signal returning from the transceiver unit over a long cable to the register CCR arrives at the proper time and does not arrive out-of-phase with the bit counter (see foregoing patent application) and other circuits of the register CCR. The frequency limiter 14 is adjusted to limit the natural frequency of the arrangement to the shortest time delay interval so that sufficient time is provided for operating the circuit elements, such as shift registers, of both transceivers even with no link delay.

What is claimed is:

1. A link accessing arrangement for supplying recurring square-wave clock pulses from a common transceiver unit to a plurality of sub-system transceiver units via a plurality of links extending therebetween, comprising:

inverting means arranged in series for providing an N number of inversions, said N number being an odd number, the output of said inverting means being coupled to its input to provide an unstable closed loop to generate the recurring square-wave clock pulses, said loop including a portion of the common unit and a selected one of the links together with a portion of the sub-system unit associated therewith;

switching means in the common unit for transferring selectively the links and their sub-system units into and out of said loop to cause the clock pulses to be supplied to and from the selected sub-system units; and delay means connected in series in said loop within said common unit for limiting the frequency of the clock pulses.

2. A link accessing arrangement according to claim 1, further including scanning means in said common unit for causing said switching means to transfer the links and their sub-system units sequentially in response to said clock pulses.

3. A link accessing arrangement according to claim 2, wherein said switching means includes a driver distributor and a receiver multiplexing circuit and scanning means for connecting and disconnecting sequentially and individually a common portion of said loop within said common unit to the link portions of said loop, said link portions each comprising a link and a portion of its associated sub-system unit, said link including outgoing conductor means extending between and interconnecting said distributor and its associated sub-system unit and including an incoming conductor means extending between and interconnecting said multiplexing circuit and said associated sub-system unit.

4. A link accessing arrangement according to claim 3, further including by-pass means responsive to said scanning means to short circuit said switching means, links and sub-system units when said scanning means is not causing said switching means to access said links.

* * * * *